United States Patent
Lippert et al.

(10) Patent No.: US 10,511,061 B2
(45) Date of Patent: Dec. 17, 2019

(54) LOW TEMPERATURE LIQUID METAL BATTERIES FOR ENERGY STORAGE APPLICATIONS

(71) Applicant: University of Kentucky Research Foundation, Lexington, KY (US)

(72) Inventors: Cameron A. Lippert, Lexington, KY (US); Kunlei Liu, Lexington, KY (US); James Landon, Lexington, KY (US); Susan A. Odom, Lexington, KY (US); Nicolas E. Holubowitch, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 82 days.

(21) Appl. No.: 15/405,754

(22) Filed: Jan. 13, 2017

(65) Prior Publication Data

US 2017/0214096 A1    Jul. 27, 2017

Related U.S. Application Data

(60) Provisional application No. 62/278,134, filed on Jan. 13, 2016.

(51) Int. Cl.
| | |
|---|---|
| *H01M 10/39* | (2006.01) |
| *H02J 7/35* | (2006.01) |
| *H02S 40/38* | (2014.01) |
| *H01M 4/38* | (2006.01) |
| *F03D 9/11* | (2016.01) |

(52) U.S. Cl.
CPC .......... *H01M 10/399* (2013.01); *H01M 4/38* (2013.01); *H01M 4/387* (2013.01); *H02S 40/38* (2014.12); *F03D 9/11* (2016.05); *F05B 2220/706* (2013.01); *H01M 2220/10* (2013.01); *H01M 2300/0057* (2013.01)

(58) Field of Classification Search
CPC ... F03D 9/11; F05B 2220/706; H01M 10/399; H01M 2220/10; H01M 2300/0057; H01M 4/38; H01M 4/387; H02S 40/38
See application file for complete search history.

(56) References Cited

U.S. PATENT DOCUMENTS

| | | |
|---|---|---|
| 3,912,999 A | 10/1975 | England |
| RE30,392 E | 9/1980 | Roche et al. |

(Continued)

FOREIGN PATENT DOCUMENTS

| | | |
|---|---|---|
| EP | 1363343 A1 | 11/2003 |
| JP | S5530110 A | 3/1980 |

(Continued)

OTHER PUBLICATIONS

English machine translation of JPH1140192.
JPS5530110—Abstract only available; also published as JPS5843869—English machine translations.

*Primary Examiner* — Adam A Arciero
(74) *Attorney, Agent, or Firm* — King & Schickli, PLLC (57) ABSTRACT

The present invention relates to a molten metal battery of liquid bismuth and liquid tin electrodes and a eutectic electrolyte. The electrodes may be coaxial and coplanar. The eutectic electrolyte may be in contact with a surface of each electrode. The eutectic electrolyte may comprise $ZnCl_2$:KCl.

6 Claims, 11 Drawing Sheets

(56) References Cited

U.S. PATENT DOCUMENTS

| | | | |
|---|---|---|---|
| 5,279,908 A | 1/1994 | Bones et al. | |
| 7,993,768 B2 | 8/2011 | Vallance et al. | |
| 8,268,471 B2 | 9/2012 | Sadoway et al. | |
| 9,000,713 B2 | 4/2015 | Boysen et al. | |
| 9,076,996 B2 | 7/2015 | Bradwell et al. | |
| 2012/0052340 A1* | 3/2012 | Ia O' et al. | H01M 12/085 429/51 |
| 2013/0040171 A1 | 2/2013 | Galloway | |
| 2013/0149590 A1 | 6/2013 | Wu et al. | |
| 2014/0099522 A1* | 4/2014 | Spatocco | H01M 10/20 429/50 |
| 2014/0272481 A1 | 9/2014 | Chung et al. | |
| 2015/0010792 A1 | 1/2015 | Amendola et al. | |
| 2015/0132627 A1 | 5/2015 | Bradwell et al. | |
| 2015/0132628 A1 | 5/2015 | Bradwell et al. | |
| 2015/0249274 A1 | 9/2015 | Bradwell et al. | |
| 2015/0295279 A1* | 10/2015 | Numata | H01M 10/399 429/103 |
| 2015/0325821 A1 | 11/2015 | Bradwell et al. | |

FOREIGN PATENT DOCUMENTS

| | | |
|---|---|---|
| JP | H1140192 A | 2/1999 |
| WO | 2015042295 A1 | 3/2015 |

\* cited by examiner

LOW TEMPERATURE LIQUID METAL BATTERIES FOR ENERGY STORAGE APPLICATIONS

RELATED APPLICATIONS

This application claims priority to U.S. Provisional Patent Application 62/278,134, filed Jan. 13, 2016, which is hereby incorporated by reference it its entirety.

GOVERNMENT SUPPORT

This invention was made with Government support under grant PON2 1300001707 awarded by the Department for Energy Development and Independence. The Government has certain rights in the invention.

TECHNICAL FIELD

The present invention relates generally to a low temperature liquid metal battery operating at about 300° C. with a $ZnCl_2$:KCl eutectic electrolyte and coaxial, coplanar liquid tin and bismuth electrodes.

BACKGROUND

It is imperative that sources of renewable energy be coupled with energy storage media for efficient and instant energy supplementation to the electrical grid. Large-scale stationary batteries offer several advantages over competing technologies (e.g. pumped hydro, compressed air storage, flywheels, and redox flow batteries) such as small environmental impact, no moving parts (i.e. low maintenance costs) and potentially very long lifetimes. To date, much research has focused on Li-based grid-scale battery technology which suffers from several setbacks, most notably cost and safety; its high energy density better suits Li technologies for transportation and portable applications. Long cycle lifetimes will be required for stationary grid energy storage and membrane crossover (redox flow batteries) or electrode degradation (Li-ion and lead-acid batteries) lead to capacity loss over time despite intensive research. Moreover, there is a general need for new, alternative battery technologies and Zn is emerging as a favored energy carrier in recently developed systems.

Molten salt-based energy storage, especially its sub-class of liquid metal batteries (LMBs), is one viable option for electrochemical grid storage due to its low cost, high charge carrier concentration, and predicted very long cycle lifetime (1000+ cycles) (10, 11). LMBs employ "structureless" electrodes which cannot physically degrade and reduce the possibility of dendrite formation that plagues solid Li and Zn metal-containing batteries. "Liquid metal battery" has previously referred to a three-layer design (anode-electrolyte-cathode) achieved using materials with different densities at the operating temperature; however, here we expand the definition to include any battery which employs liquid metallic electrodes (in any orientation). Emerging LMB technologies have thus far been limited to materials (electrode and electrolyte) demonstrating this self-separating layered design which is attractive from a fabrication standpoint (i.e. at minimum, only a simple vessel with a metallic base contact is required) but the stratified design is susceptible to electrode dissolution or magnetohydrodynamic instabilities at high current densities which could lead to cell shorting and thermal runaway. Furthermore, this specialized cell design (requiring immiscible materials with the density of molten salt between that of the anode and cathode) precludes many potential active and low-cost materials, and often requires exceedingly high operating temperatures (>500° C.). Therefore, orientation of electrodes in the non-traditional configuration introduced in this work, where an arc is the shortest path between anode and cathode rather than a line, opens the door for a plethora of high temperature battery materials to be investigated.

An ultimately commercially valuable large scale LMB should have moderate operating temperatures, economical components, and long term cycling stability. Up to now, much research has foregone these marketable features, instead focusing on cells with reactive and costly components that achieve high power output or high nominal voltage. ZEBRA, Mg—Sb, and Ca-based batteries exemplify this point. ZEBRA, while capable of a moderate working temperature (245° C.) is limited in robustness with its beta alumina solid electrolyte and in safety with liquid Na and $[AlCl_4]^-$ active components. Mg—Sb and Ca-based LMBs rely on reactive metals and must operate at exceedingly high temperatures (500-700° C.) in order to liquefy the materials. In the present work, we seek to address the shortcomings of these battery technologies while keeping material/energy costs low. Favorable properties of the above have been combined with Zn-based alloys and the low melting $ZnCl_2$:KCl eutectic to demonstrate a LMB which is promising for large scale energy storage.

SUMMARY OF THE INVENTION

The present invention provides a liquid metal battery (LMB) comprising a vessel holding a first electrode of liquid tin (Sn) and a second electrode of liquid bismuth (Bi). Both the first electrode and the second electrode are in contact with a eutectic electrolyte. The eutectic electrolyte may be $ZnCl_2$:KCl. The first electrode and said second electrode may be coaxial and coplanar.

A LMB requires a certain temperature in order to function properly. Where the electrodes are liquid Sn and liquid Bi, the operating temperature needs to be about 300° C.

The present invention also includes energy storage facilities comprising the liquid metal battery described herein. The energy storage facilities may include a source of energy generation, such as a solar cell and/or a wind turbine.

The present invention also provides for methods of storing energy, featuring charging the LMB described herein. The methods further require an operating temperature of about 300° C.

BRIEF DESCRIPTION OF THE DRAWINGS

FIG. 8 shows DSC analysis of electrodes after freezing.

DETAILED DESCRIPTION

The present invention provides for a liquid molten battery system comprised of coaxial, coplanar liquid tin (SN) and bismuth (Bi) electrodes with a $ZnCl_2$:KCl eutectic electrolyte. Operation of the LMB is possible at temperatures around 300° C. The present invention also provides methods of preparing and using the LMB systems described herein.

The invention described herein is a device and method to store energy as thermal and electrical energy. The device is a low temperature liquid metal battery operating at ca. 300° C. using a $ZnCl_2$:KCl eutectic electrolyte and coaxial, coplanar liquid Sn and Bi electrodes. Using liquid host metals, the favorable energy storage properties of Zn was harnessed to construct a novel battery. Low-melting alloys with high Zn capacity such as ZnSn circumvent the issue of dendrite formation associated with plating solid Zn. The findings present a new option for electrochemical Zn-based energy storage using the $ZnCl_2$:KCl molten salt as a low cost, stable, and safe electrolyte. The main drawback of molten salt electrolytes—i.e. high viscosity—was overcome by exploiting that property to establish a salt bridge and isolate anode and cathode redox half-reactions. The cell arrangement—a coaxial, coplanar electrode design—provides reversible cyclic performance over many days in the Sn(Zn)||Bi battery and further electrode geometry optimization should lead to larger output current and power densities. Half-cell experiments elucidated thermodynamic behavior in these novel systems and the results translated directly to full cells, thus providing a simple screening method to test many more materials for the growing interest in LMBs for large-scale energy storage.

Figure 1A:
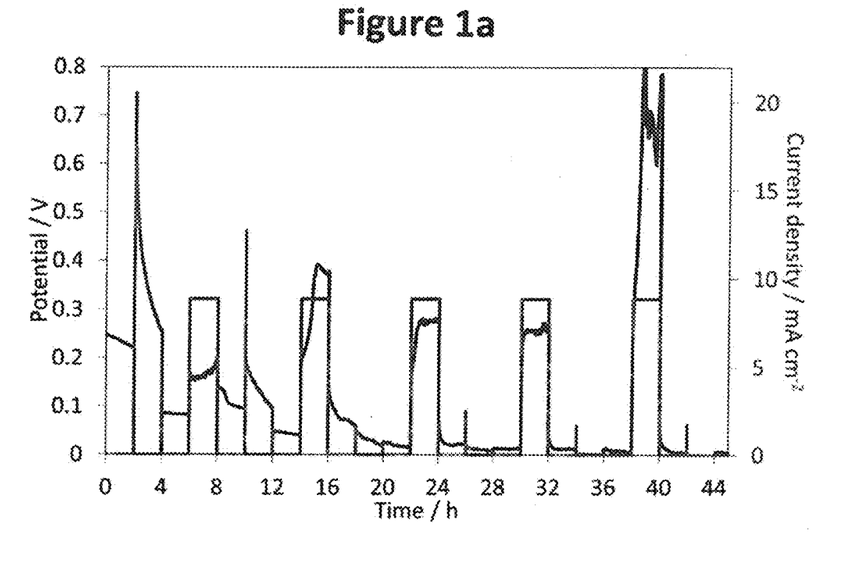
FIG. 1a shows cycling data from Zn—Sn cell with $ZnCl_2$:KCl electrolyte where the cell was in a charged state (SOC=100%) as-prepared. The testing regimen allowed for discharge at 0 V (i.e. short-circuit currents for $Zn^{2+}$ reduction at the liquid Sn cathode) followed by charging currents at a constant 100 mA, driving the Zn back to the anode.
Figure 1B:
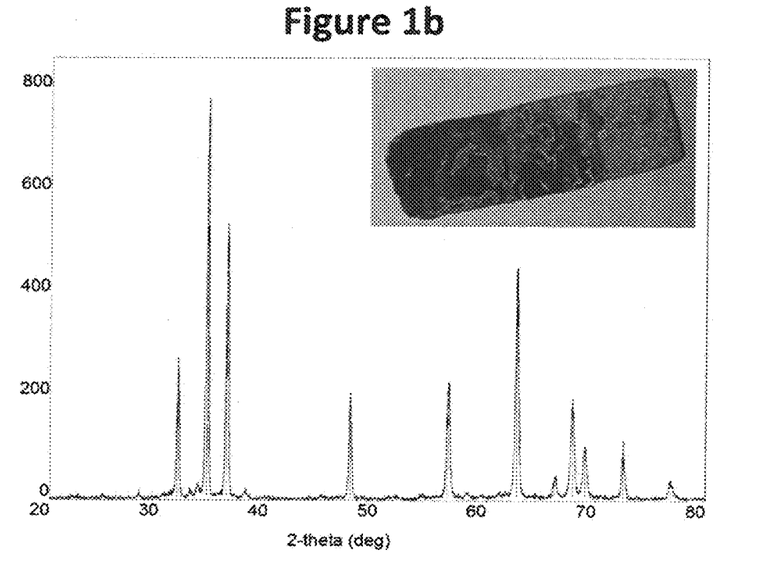
FIG. 1b shows XRD spectrum of solid "crust" observed on liquid Sn surface after cycling (inset shows corroded Zn electrode after cycling).

Solid Zn metal performed satisfactorily as a negative electrode (anode) material which formed ZnM alloys in liquid positive electrodes, i.e. the cathodes Sn, Bi, or Pb, upon discharge, as well as being a suitable pseudo-reference electrode for the thermodynamic study. The overall cell reaction is Where M represents a solvent metal in which Zn is stabilized with a negative Gibbs free energy of formation from its pure form, as has been observed analogously for Ca and for Zn with lanthanides and actinides. Cyclability of these prototype cells, however, was poor owing to well-known difficulties in electrodepositing solid Zn (i.e. charging mechanism at the negative electrode). Capacities quickly faded over several cycles due to dendritic Zn formations poorly adhering to a corroding Zn solid substrate (FIG. 1). The dendrites formed by localized charging currents yielded non-uniform, lowest energy deposition in the high molal (5.8 m) $Zn^{2+}$ eutectic, and these deposits either extended through the electrolyte and into the cathode (shorting the cell) or detached from the negative electrode and fell onto the liquid cathode (cell depolarization). Ultimately, a ZnO layer (confirmed by XRD, FIG. 1b) formed on the liquid metal cathode surface and the Zn negative electrode could macroscopically be observed severely corroded (inset, FIG. 1b). These data are representative of all Zn—M(I) systems investigated (M=liquid Sn, Bi, or Pb).

Figure 2:
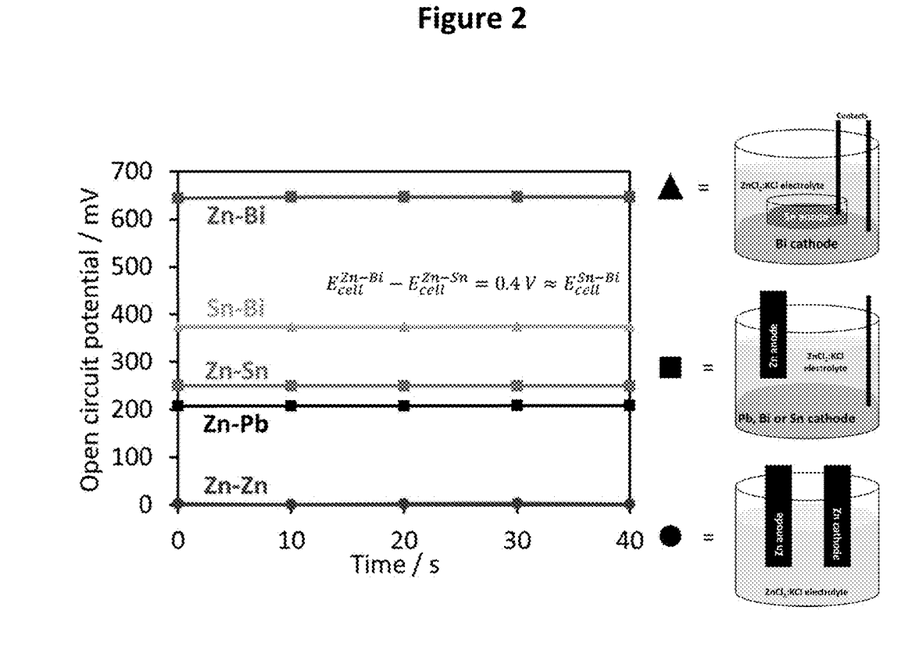
FIG. 2 shows thermodynamic data from three biphasic cell configurations at 320° C.: solid-solid Zn (circles), solid-liquid Zn—Sn, Pb, or Bi (squares), and liquid-liquid Sn—Bi (triangles).

Despite poor cycling ability, the results nevertheless indicated that an electromotive force (emf) was available between Sn and Bi electrodes which were experimentally confirmed by measuring the OCV of a cell made with liquid metal Sn and Bi (FIG. 2). Standard reduction potentials give an $E°_{cell}$ of 1.07 V for the half reactions we predicted to occur in this design (Bi oxidation/Zn reduction) but the extremely non-standard conditions, i.e. our high temperature, high concentration solvent-less system warranted a detailed empirical investigation.

Material Selection

It is first demonstrated that no emf exists between symmetric Zn electrodes, as expected, since the half-cell reactions are identical. Zn—M cells with M=liquid Pb, Sn, or Bi showed positive OCVs (208, 250, and 646 mV, respectively) suggesting that the cells are charged as-prepared where Zn (the least noble metal) is the negative electrode, and the liquid metal is the positive electrode. The mechanistic origin of these emfs is not immediately clear from a classical thermodynamics perspective (i.e. they are not well-predicted by tabulated values) owing to several possible contributing factors: a large deviation from standard conditions; extremely high ionic concentration/activity (they are not solvated); and complexities of the (metal-)molten salt-liquid metal interface. Further discussion on LMB thermodynamics for an analogous system can be found elsewhere. The results here demonstrate that the thermodynamics of a liquid-liquid metal battery prototype can indeed be predicted empirically from a Zn reference system where $E_{cell}^{Zn-Bi} - E_{cell}^{Zn-Sn} \approx E_{cell}^{Sn-Bi}$.

Host Metal Selection.

Figure 3:
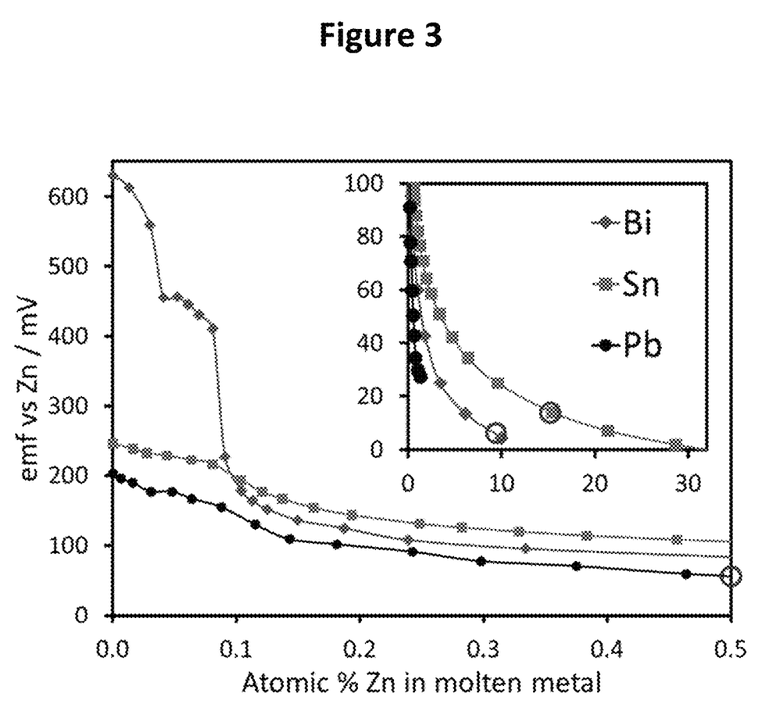
FIG. 3 shows thermodynamic data for Zn addition to molten metals at 315° C. (Sn and Bi) and 330° C. (Pb). The inset has the same units showing the full x-axis data and red circles indicate eutectic compositions.

To investigate and select a host negative electrode metal for reversible Zn alloy formation, we measured the emf of molten alloys with increasingly higher Zn content versus a Zn metal reference (FIG. 3). Bi, Pb, and Sn were chosen for their relatively low melting points, safety/non-toxicity (Sn and Bi), and availability/cost (assuming the price of Bi could come down significantly if it finds more commercial utility than its current niche applications). While pure molten Bi shows the largest emf vs. Zn (>600 mV), its driving force quickly drops to values below that of Sn with small (0.1 at %) Zn addition. Pb has the lowest initial emf which remains lowest for all Zn additions—the Pb data is truncated since the liquidus for Pb—Zn rises sharply beyond ~0.5 at % Zn, becoming solid at this working temperature. Sn, however, maintains the highest emf of the three metals beyond 0.1 at % Zn content, and does not cross the x-axis (i.e. thermodynamically equivalent to Zn metal) until ca. 32 at % Zn (inset). This implicates Sn as a good negative electrode candidate, as it can hold a high Zn content while providing more of an electrochemical driving force in the preferred molten phase than would solid Zn. Sn also has the lowest melting and eutectic points (230 and 198.5° C.) which may enhance Zn mobility. Of these metals, Bi is a cathode candidate because it has the largest potential relative to pure Zn.

The circles in FIG. 3 indicate eutectic compositions of M—Zn alloys. The eutectic is kinetically significant because mobility of Zn in M is increased at compositions near this point. Thus, despite the thermodynamic capacity being approached (nearing 0 V vs Zn), the kinetics become more favorable which should allow a full cell to maintain or increase power output at low states of charge. From the above analysis, and considering the high density of Bi and Pb where Zn diffusion may be impeded, Sn was selected as an appropriate host electrode material.

Sn|ZnCl$_2$:KCl|Bi Cell.

Figure 4:
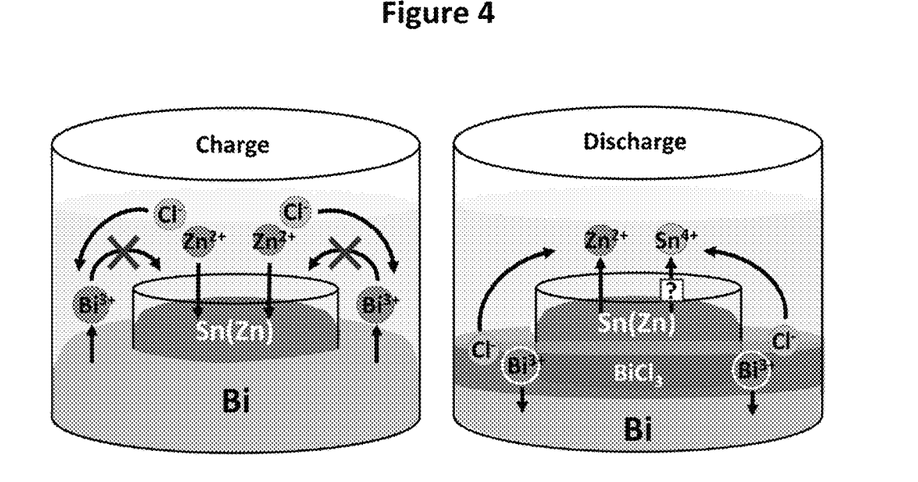
FIG. 4 shows a schematic of proposed charge movement during charge and discharge phases in Sn(Zn)||Bi battery with $ZnCl_2$:KCl electrolyte.

The measured OCV of 400 mV for the Sn—Bi cell indicated that Sn served as the negative electrode and Bi was the positive electrode. In contrast to most electrochemical cell designs including all other LMB designs published to-date, the electrodes were not (indeed, they could not be) oriented in a typical parallel plate configuration with a straight line being the shortest inter-electrode path, since liquid Bi and Sn are both more dense than ZnCl$_2$:KCl. The implications of our coaxially oriented electrodes are that charged species (Cl$^-$) must travel in a parabolic path in balancing the charge passed through the external load (FIG. 4). This will undoubtedly contribute to internal cell impedance but is compensated for by the very high chloride concentration and the fact that ion mobility in molten salts is orders of magnitude higher than in aqueous batteries (19). Furthermore, the electromagnetic field generated when passing currents in the coaxial electrode configuration may actually enhance non-linear ionic mobility, although this is out of the scope of the current investigation. The validity of hypothesized electrochemical reactions occurring in our system (FIG. 4) will be explored in the following results and discussion.

Cycling Tests.

Figure 5:
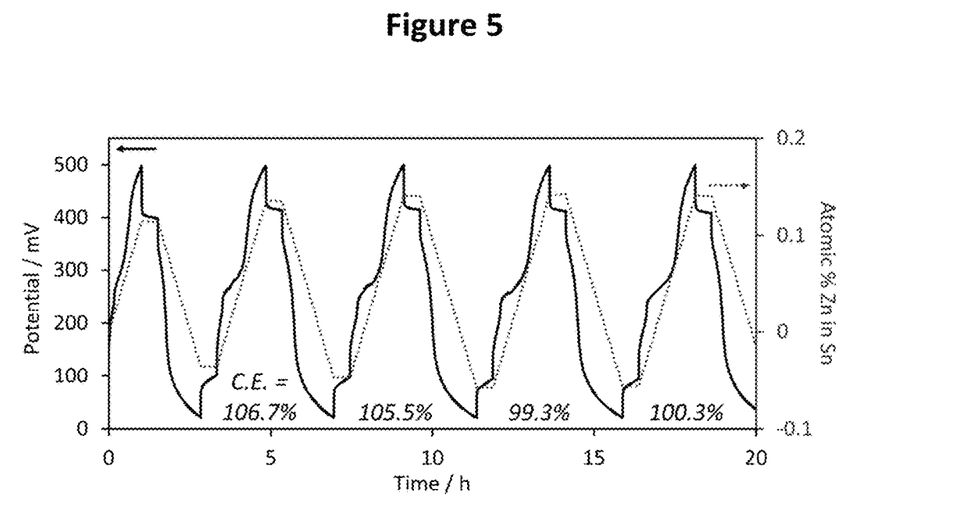
FIG. 5 shows the first few cycles of the Sn—Bi battery charging and discharging at constant 10 mA and 30 min rests (OCV) between phases. Secondary axis shows Sn's at % uptake of Zn during testing. C.E.=coulombic efficiency (discharge capacity divided by preceding charge capacity) and temperature=318±3° C.

The Sn—Bi battery with coaxial electrodes and ZnCl$_2$: KCl electrolyte was subjected to cycling tests as-prepared. It was initially unclear what suitable cutoff voltages should be for this new system so 500/20 mV were initially chosen for charge/discharge voltage thresholds at constant currents of 10 mA (~3 cm$^2$ electrode area), and data for the first few cycles are shown in FIG. 5. The cycling regimen includes 30 minute rests between each charge or discharge phase to allow for thermal convective mixing of the newly formed molten alloys and the secondary axis shows the atomic % of Zn going into or out of the Sn negative electrode (calculated by charge passed on each phase assuming 100% charge efficiency). The same wave shape is assumed for Bi oxidation to Bi$^{3+}$ during charge and reduction back to Bi during discharge.

Upon charging, Zn$^{2+}$ in the electrolyte must be reduced at Sn (the negative electrode) with a corresponding oxidation reaction (Bi–>Bi$^{3+}$) at the positive electrode. A new BiCl$_3$ phase then forms above the molten Bi which does not mix significantly with the bulk electrolyte owing to its higher density  (20) and $\rho_{320°\ C.}^{ZnCl_2:KCl}$=2.21 g cm$^{-3}$ (21)). Pure ZnCl$_2$:KCl remains between the cathode and anode serving as both a salt bridge and active negative electrode component.

Charging to 500 mV occurs over ~2 h and the voltage profile shows a shoulder early in the charge. The OCV after Zn reduction at Sn is stable at 400 mV after each charge and a liquid SnZn alloy has formed; the binary phase diagram shows a depressed melting point in the already liquid Sn when a small amount of Zn (up to 14.9 at %) is incorporated (22). Upon discharge, oxidation at the anode may either be Zn–>Zn$^{2+}$ or Sn–>Sn$^{4+}$ with complementary reduction of either Bi$^{3+}$ or Zn$^{2+}$ to its neutral form at the molten Bi cathode. The nobility series of these elements from standard reduction potentials gives: Bi (+0.31 V), Sn$^{4+\rightarrow 2+}$ (+0.15 V), Sn$^{2+\rightarrow 0}$ (−0.13 V), and Zn (−0.76 V). This suggests that Zn and Bi will be preferentially oxidized and reduced, respectively, for the overall cell reaction:

$$3Zn+2Bi^{3+} \rightarrow 3Zn^{2+}+2Bi;\ E_{cell}=400\ mV \qquad [1]$$

FIG. 5 indicates a slight deviation from this behavior over several cycles, where the atomic % of Zn in Sn goes below zero thus indicating some portion of the charge passed was associated with Sn oxidation and Zn reduction at anode and cathode which likely gives rise to features such as shoulders in the voltage profile. This would also explain the >100% the coulombic efficiencies observed in the first cycles, where Bi(I) can accept a small amount of reduced Zn. Also possible is metal dissolution in molten salt or the formation of insoluble species as a thin solid-electrolyte interphase (SEI) at one or both of the electrodes from a small uptake of ambient O$_2$ or H$_2$O during testing (e.g. in the form of ZnO or oxychlorides), but the process appears to be self-limiting as we have not observed any long-term capacity fading. The SEI therefore does not significantly inhibit charge mobility in the battery.

The above analysis presumes that the Bi$^{3+}$ generated during charging does not traverse the electrolyte and reach the Sn electrode, evidence of which we never observed (e.g. cell depolarization during extended charging). The glass separation barrier, viscosity of molten salt, and BiCl$_3$ phase all contribute to segregating anodic and cathodic processes. These form a simple salt bridge balancing charge with the high concentration of mobile Cl$^-$ ions and preclude the need for expensive membranes or cumbersome separators, which would easily degrade under LMB operating conditions.

Effect of Temperature.

The temperature was raised to examine its effect on kinetics in the Sn—Bi battery. Charging time to the 500 mV cutoff voltage increased from two to five hours when cell temperature increased by 30° C. which. This represents a 2.5× increase in capacity at the negative electrode: a higher degree of alloying (Zn in Sn) is achieved because the liquidus is reduced. The potential shoulder during charging also becomes more pronounced at the elevated temperature (hours 50-62 in FIG. 6). This phenomenon has not been observed in previous LMB systems and may be related to new phase formation at either electrode. Coulombic efficiency is reduced at these temperatures since the charging shoulder is not mirrored in the discharge phase.

Post-Cycling Materials Analysis.

Figure 7:
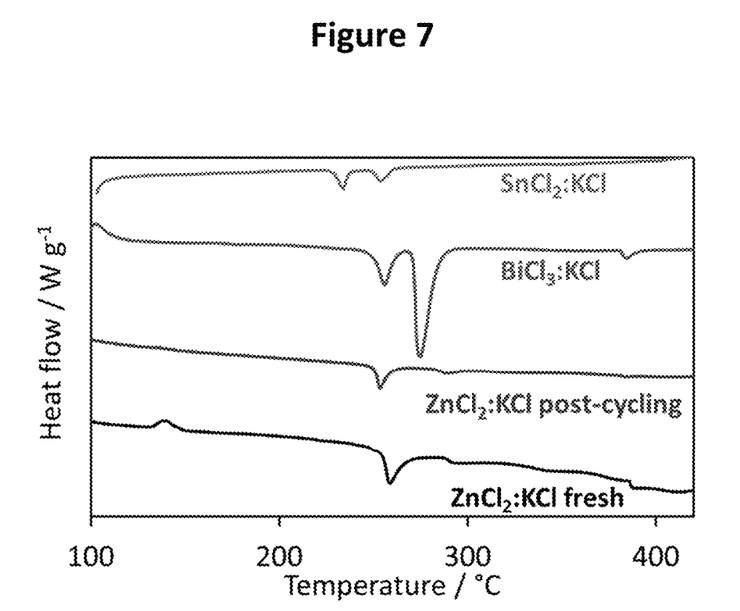
FIG. 7 shows DSC analysis of pristine eutectic salts potentially formed during cycling and "used" bulk battery electrolyte after cycling. Data are offset for ease of visualization.

An analysis of the battery materials (electrodes and electrolyte) was carried out after the above cycling experiments. The experiment was stopped when the calculated Zn content in the Sn anode was 0.17 at % and at the cathode contained 59 mg BiCl$_3$. DSC of all the pristine salts containing reduced metal species that could have formed in our cell (ZnCl$_2$:KCl, SnCl$_2$:KCl, and BiCl$_3$:KCl) was taken to compare to the bulk battery electrolyte after cycle tests (FIG. 7). The spectra show that the bulk electrolyte essentially remained as pristine ZnCl$_2$:KCl eutectic. This reflects the integrity of the electrolytic salt bridge which prevents mixing of active species that would degrade cell capacity throughout cycling.

Figure 8A:
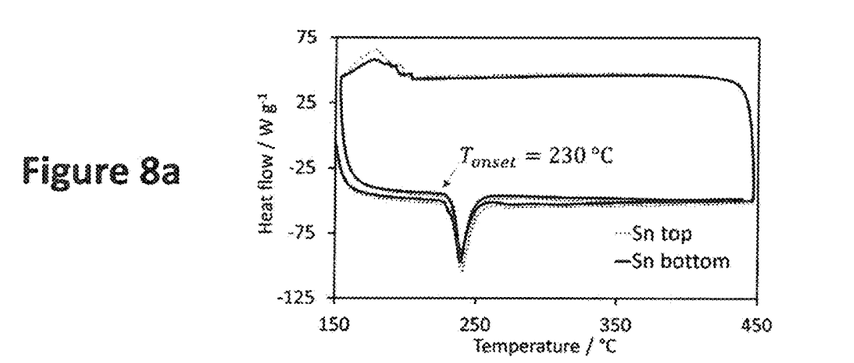
FIG. 8a shows two heating and one cooling cycle of a Sn negative electrode and FIG. 8b shows two heating and one cooling cycle of a Bi positive electrode. "Top" refers to the surface exposed to electrolyte.
Figure 8B:
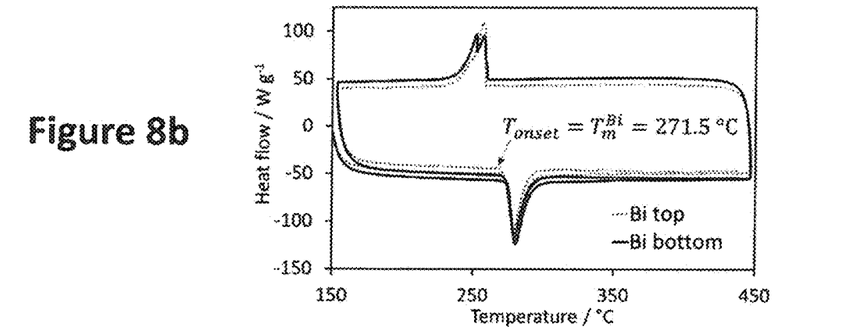

The degree of alloying in the electrodes is an important factor in determining LMB capacity because Zn is the active negative electrode material stored in a liquid Sn host. It was unclear as to whether sufficient thermal mixing would occur in the liquid metal alloys (i.e. does a SnZn alloy formed during charge phases mix uniformly or is Zn enriched at the electrode-electrolyte interface). After freezing and without mechanically induced stirring, the electrodes were analyzed by DSC and EDX at the "top" (interfacing the electrolyte) and "bottom" (unexposed to electrolyte) of each metal (FIG. 8 and Table 1). For DSC, according to their ternary phase diagrams (22), any uptake of metals available in the battery (Zn, Bi, or Sn) into pure Sn (anode) or Bi (cathode) would reduce the melting point. The Sn electrode (FIG. 8a) shows a slight reduction in melting point ($T_{onset}$=230° C. compared to $T_m^{Sn}$=232° C.) supporting the charging data: alloy formation to a small atomic % Zn. Furthermore, top and bottom areas of the electrode yield virtually identical spectra (same $T_{onset}$) indicating that a homogeneous alloy had been formed. Formation of uniform alloys increases the battery's capacity and is critical to ultimate achievable current densities. If the rate of alloy mixing is below a critical current density, Zn will accumulate at the surface and may form solid Zn dendrites extending into the bulk electrolyte. To solve this issue and increase power output, we are exploring different electrode geometries (e.g. small hemispherical molten Sn arrays) which will increase surface area and Zn diffusion. The positive Bi electrode (FIG. 8b) had an onset temperature equivalent pure Bi ($T_m^{Bi}$=271° C. suggesting that no Zn or Sn species reached the cathode.

Phase change data were supplemented by EDX elemental analysis of top and bottom areas of each electrode which were allowed to freeze immediately after cycle tests. According to Table 1, there was no statistically significant difference in Zn composition at either side of the electrode. This corroborates the electrochemical processes hypothesized to occur during charge and discharge processes detailed above. Interestingly, the average 5 at % Zn in Sn detected was significantly higher than that predicted by the charges passed at end of testing. This could be due to incomplete Zn stripping during discharge; if there is a metastable liquid SnZn composition, Sn may be preferentially oxidized before complete Zn stripping, leaving some amount of Zn always in the alloy after initial cycling. There may also be natural anisotropic enrichment of Zn near the surface of the alloy upon freezing.

TABLE 1

EDX analysis of negative (originally 100% Sn)
and positive (orig. 100% Bi) electrodes after cycling.
Values are averages of two different spots from each side.

| Electrode | Top (at %) | | | Bottom (at %) | | |
|---|---|---|---|---|---|---|
| | Bi | Sn | Zn | Bi | Sn | Zn |
| Negative | 0 | 94.5 | 5.5 | 0 | 95.5 | 4.5 |
| Positive | 100 | 0 | 0 | 100 | 0 | 0 |

Effect of Starting with SnZn Alloy.

It was next set about to explore the performance and voltage range of a Sn||Bi battery where the negative electrode already contains some Zn (e.g. it is more charged than pure Sn as constructed). In a fresh Sn||Bi cell, the initial OCV increased from 355 mV to 502 mV after adding 0.65 at % Zn alloy to Sn. This in excellent agreement with the pure metal thermodynamic data from FIG. 3 and FIG. 4; 0.65 at % Zn in Sn brings it 151 mV closer to pure Zn-like behavior (0 V vs. Zn).

Figure 6:
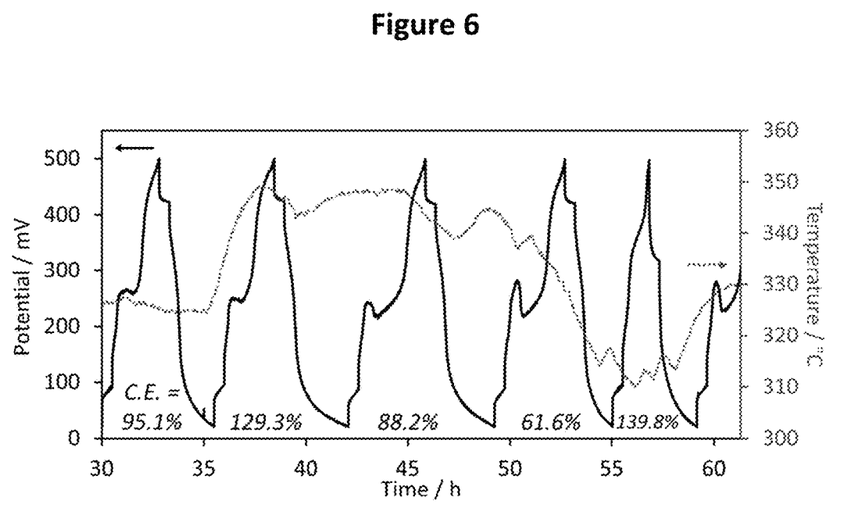
FIG. 6 shows the effect of temperature on Sn||Bi battery (cycles 8-12 shown following the same testing regimen as FIG. 5).
Figure 9:
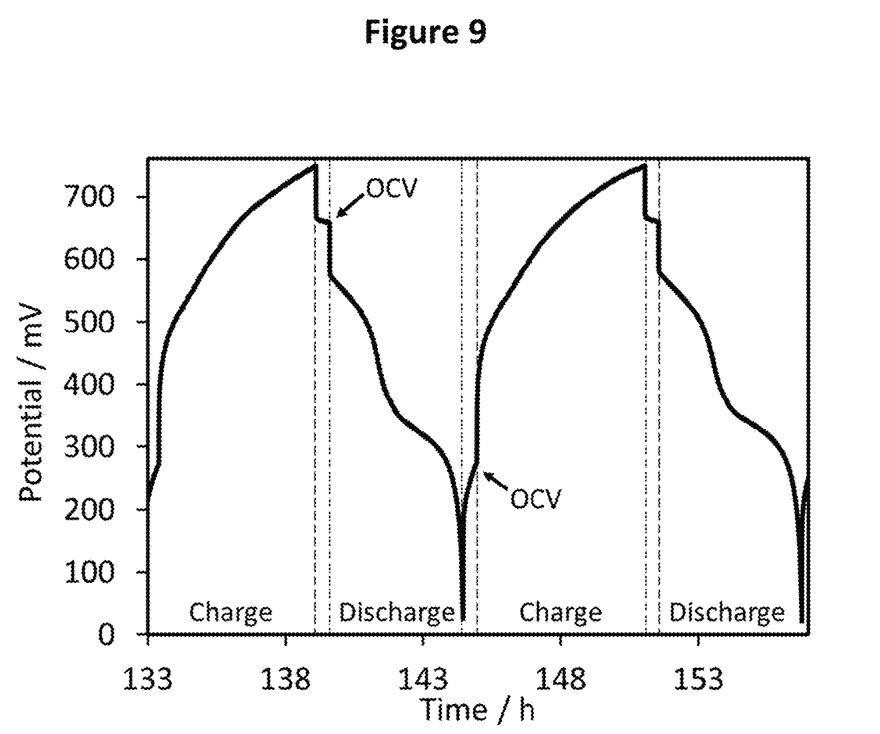
FIG. 9 shows two cycles from cycling Sn(Zn)||Bi to a higher cut-off voltage of 750 mV at constant 10 mA and 320° C.

In cycling tests performed as in FIG. 5 and FIG. 6 (constant 10 mA, 500 mV cut-off), the Sn(Zn)||Bi cell yielded a voltage profile with similar cyclical behavior. The 500 mV cut-off for all above cycle tests had been selected somewhat arbitrarily due to the unknown performance and capacity of these novel cells. To see if the cell could deliver a higher output voltage, the charging cut-off value was first increased to 750 mV with a representative two-cycle window shown in FIG. 9. Two waves are observed during discharge which are difficult to interpret since the phase diagram for ZnSn does not show binary phases and the cathode is presumably undergoing a simpler process. Thermal convection or concentration-dependent inter-atomic interactions in the molten ZnSn cathode may give way to the observed phenomenon at this temperature.

Figure 10:
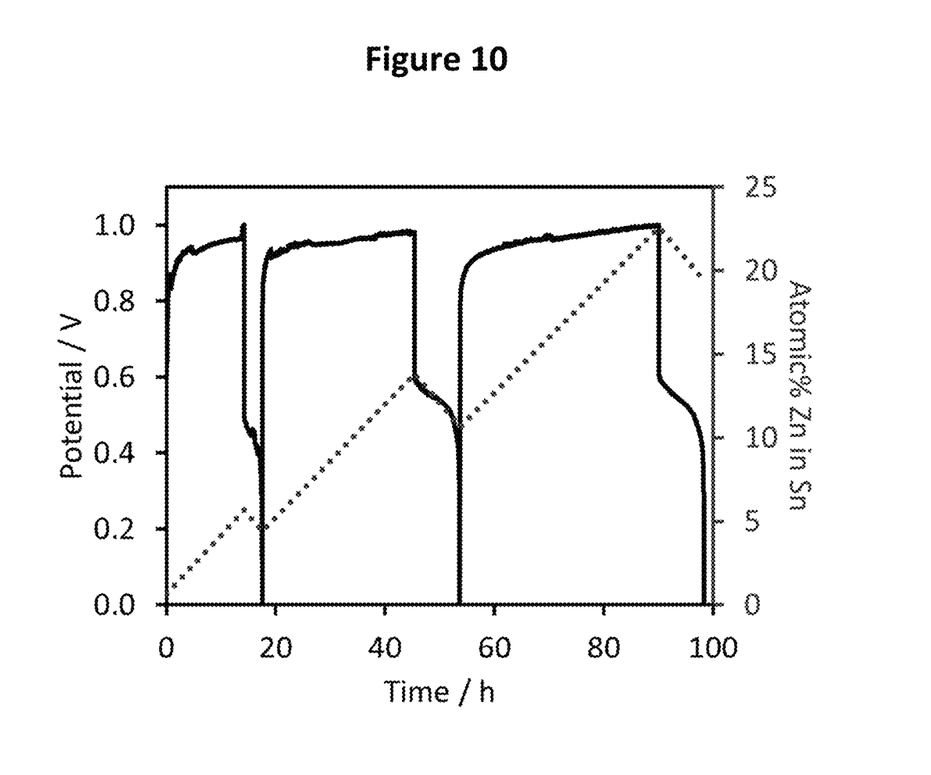
FIG. 10 shows charge-discharge curves for three cycles of Sn(Zn)||Bi cell at constant 10 mA with higher cut-off voltage (1 V) at 320° C.

To explore the limits of the cell, the cut-off charging voltage was increased to 1.0 V. Interestingly, the charge voltage plateaus around 0.95 V, only gradually increasing to 1 V over many hours (35 h in cycle 3). Also, at the higher limit, coulombic efficiency decreases as the Sn electrode accepts more and more Zn without releasing it during discharge (secondary axis, FIG. 10). Since most metals are soluble to some degree in molten salts (typically as lower valence dimers e.g. $Zn_2^{2+}$), the solubility of Zn, Sn, or Bi in ZnCl$_2$:KCl or Bi in BiCl$_3$ may contribute to this behavior (23). While the solubility of Zn in its molten chloride is low (<0.18 mol %), Bi metal exhibits high solubility in BiCl$_3$ (46 mol % at 320° C.) and a solid BiCl subhalide species may form during charge and reduce discharge capacity. The cell may thus be better suited for a design using less Bi (0.05 mol used in this case) or for alternative cathode geometries such as hemispherical molten Bi arrays where BiCl$_3$ generated during charge would have a smaller contact area with metallic Bi. This is also one of few feasible routes to increase the surface area of molten electrodes for higher output current densities due to radial diffusion of active species.

EXAMPLES

Materials

A custom-built heater was machined in-house from an Al block (Multipurpose 6061 alloy, McMaster-Carr). The Al was milled to house five cartridge heaters (500-W, McMaster-Carr) powered by two Variacs around a central reactor compartment, which was bored to fit a 50 mL beaker snugly along the sides and base. Anhydrous ZnCl$_2$ (stored in an argon-filled glove box) and KCl were used to make 1:1 (molar ratio) ZnCl$_2$:KCl molten salt electrolytes (46.32 g total). The room temperature salts were pre-mixed with a glass rod to ensure uniform melting. Tin shot (99.8%, Strem) and Pb shot (99.9%, Aldrich) were used as-received while Bi pieces (99.99%, Fisher) and Zn foil (99.9%, Strem) were physically abraded with 220-grit sandpaper followed by acetone and DI rinsing to remove the dull oxide layer and reveal shiny surfaces before using.

Cell

Figure 11:
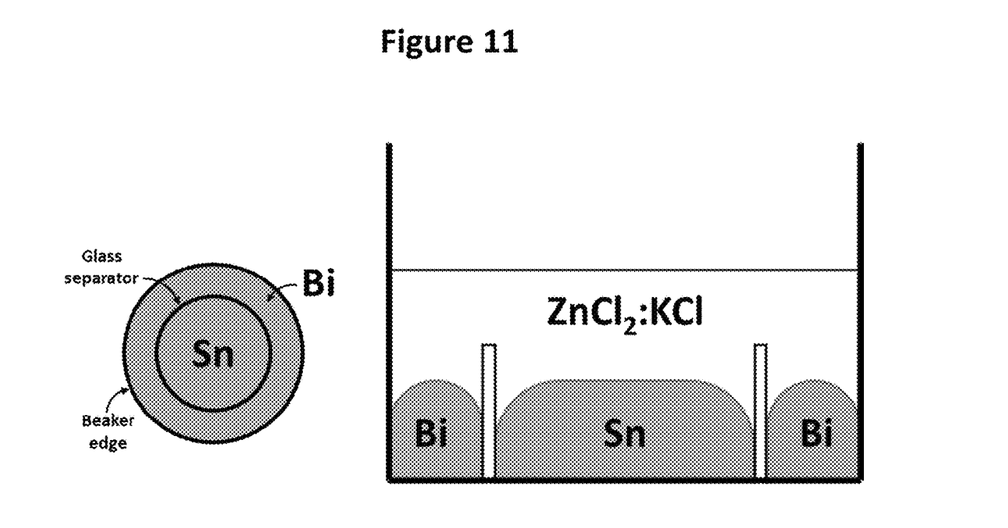
FIG. 11 shows top-down (left) and cross-sectional (right) schematics of Sn(Zn)|$ZnCl_2$:KCl|Bi cell. The molten Bi and Sn electrodes form a disk-ring geometry separated by a glass cylinder and blanketed by molten $ZnCl_2$:KCl salt.

To form the cell, a short (h=0.5 cm, thickness=1.2 mm, I.D.=1.5 cm), open-ended glass cylinder separator was fused to the base of a beaker. The inner and outer isolated compartments were filled with 0.165 mol each of Sn and Bi, respectively, forming a coaxial, co-planar ring-disk electrode geometry. The outer ring thickness (~0.5 cm) and inner ring diameter (~1.3 cm) gave roughly equivalent geometric surface areas and both compartments were blanketed with the pre-mixed salt electrolyte solids. The cell was placed in the reactor and brought to 400° C. for 1 h to melt the electrodes, fuse the eutectic salt, and drive off absorbed moisture. The cell was then brought down to operating temperature and the metals were observed to be molten and covered by the transparent liquid electrolyte which extended about 1 cm above the electrode compartments (FIG. 11). Before experiments, contacts were made to the molten metals by graphite rods which were observed not to interfere with the battery's electrochemistry and the cell was lightly covered with an insulating ceramic fiber sheet. No visible changes in electrolyte opacity were observed after several days of experiments, indicating minimal insoluble oxide or oxychloride formation. Initial results were reproducible with fresh electrodes after several hours, further demonstrating electrolyte stability.

The foregoing descriptions of various embodiments provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention. All publications, patents and patent applications referenced herein are to be each individually considered to be incorporated by reference in their entirety.

The invention claimed is:

1. A liquid metal battery comprising a vessel, the vessel holding a first electrode of liquid tin (Sn) and a second electrode of liquid bismuth (Bi) in a co-axial and co-planar ring-disk electrode geometry arrangement, wherein the first electrode and the second electrode are in contact with a eutectic electrolyte blanketed above.

2. The liquid metal battery of claim 1, wherein said eutectic electrolyte is $ZnCl_2$:KCl.

3. An energy storage facility comprising the liquid metal battery of claim 1.

4. The energy storage facility of claim 3, further comprising a source of energy generation.

5. The energy storage facility of claim 4, wherein said source of energy generation is a solar cell.

6. The energy storage facility of claim 4, wherein said source of energy generation is a wind turbine.

* * * * *